US010816987B2

(12) United States Patent
Akella et al.

(10) Patent No.: US 10,816,987 B2
(45) Date of Patent: Oct. 27, 2020

(54) RESPONSIVE VEHICLE CONTROL

(71) Applicant: Zoox, Inc., Foster City, CA (US)

(72) Inventors: Abishek Krishna Akella, Pleasanton, CA (US); Janek Hudecek, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 144 days.

(21) Appl. No.: 16/160,594

(22) Filed: Oct. 15, 2018

(65) Prior Publication Data

US 2020/0117200 A1    Apr. 16, 2020

(51) Int. Cl.
  *G05D 1/02*    (2020.01)
  *G05D 1/00*    (2006.01)

(52) U.S. Cl.
  CPC ......... *G05D 1/0214* (2013.01); *G05D 1/0088* (2013.01); *G05D 1/0223* (2013.01); *G05D 2201/0213* (2013.01)

(58) Field of Classification Search
  CPC combination set(s) only.
  See application file for complete search history.

(56) References Cited

U.S. PATENT DOCUMENTS

| 9,688,276 | B2* | 6/2017 | Ge | E02F 9/2253 |
| 10,635,913 | B2* | 4/2020 | Yang | G05D 1/0274 |
| 2003/0097212 | A1* | 5/2003 | Feser | G01P 15/18 |
| | | | | 701/45 |
| 2003/0105582 | A1* | 6/2003 | Nordsiek | G01C 21/26 |
| | | | | 701/400 |
| 2010/0318286 | A1* | 12/2010 | Lorkowski | G01S 19/48 |
| | | | | 701/119 |
| 2011/0231096 | A1* | 9/2011 | Ridenour, II | G08G 5/0008 |
| | | | | 701/301 |
| 2011/0288714 | A1* | 11/2011 | Flohr | G05D 1/0206 |
| | | | | 701/27 |
| 2014/0114548 | A1* | 4/2014 | Kagerer | B60W 30/16 |
| | | | | 701/96 |
| 2015/0210280 | A1* | 7/2015 | Agnew | B60W 30/095 |
| | | | | 701/48 |
| 2015/0300825 | A1* | 10/2015 | Manoliu | G01C 21/3484 |
| | | | | 701/36 |
| 2015/0347310 | A1* | 12/2015 | Ish | G06F 3/0679 |
| | | | | 711/3 |

(Continued)

FOREIGN PATENT DOCUMENTS

| DE | 102006056629 A1 | 6/2008 |
| DE | 102006056631 A1 | 6/2008 |

(Continued)

OTHER PUBLICATIONS

The PCT Search Report and Written Opinion dated Apr. 20, 2020 for PCT Application No. PCT/US2019/056331, 13 pages.

*Primary Examiner* — Kaveh Abrishamkar
(74) *Attorney, Agent, or Firm* — Lee & Hayes, P.C.

(57) ABSTRACT

Acceleration determination for controlling a vehicle, such as an autonomous vehicle, is described. In an example, objects in an environment of the vehicle are identified and a probability that each object will impact travel of the vehicle is determined. Individual accelerations for responding to each object may also be determined. Weighting factors for each of the accelerations may also be determined based on the probabilities. A control acceleration may be determined based on the weighting factors and the accelerations.

20 Claims, 3 Drawing Sheets

(56) References Cited

U.S. PATENT DOCUMENTS

| | | | |
|---|---|---|---|
| 2016/0103218 A1* | 4/2016 | Mandava | B60Q 9/008 |
| | | | 701/301 |
| 2017/0154225 A1* | 6/2017 | Stein | B60W 30/16 |
| 2017/0166217 A1* | 6/2017 | Sbianchi | A61B 5/18 |
| 2017/0248950 A1* | 8/2017 | Moran | G05D 1/0055 |
| 2017/0329332 A1* | 11/2017 | Pilarski | B60W 30/0956 |
| 2018/0022361 A1* | 1/2018 | Rao | B60W 30/143 |
| | | | 701/23 |
| 2018/0232585 A1* | 8/2018 | Kim | G06N 3/0445 |
| 2018/0270542 A1* | 9/2018 | Ramalingam | G02B 27/0101 |
| 2019/0111916 A1* | 4/2019 | Lee | G05D 1/0061 |
| 2019/0291727 A1* | 9/2019 | Shalev-Shwartz | G08G 1/163 |
| 2019/0333381 A1* | 10/2019 | Shalev-Shwartz | |
| | | | G05D 1/0088 |
| 2020/0031340 A1* | 1/2020 | Tao | G05D 1/0223 |
| 2020/0117200 A1* | 4/2020 | Akella | B60W 30/0953 |

FOREIGN PATENT DOCUMENTS

| | | |
|---|---|---|
| DE | 102008057367 A1 | 5/2010 |
| EP | 2845779 A1 | 3/2015 |
| EP | 2902291 A1 | 8/2015 |

\* cited by examiner

RESPONSIVE VEHICLE CONTROL

BACKGROUND

Planning systems utilize information associated with objects (e.g., dynamic agents) in an environment to determine actions relative to those objects. For example, some existing systems control a vehicle to slow down and/or stop upon determining that an object is likely to enter a drive path of the vehicle. However, conventional models may over- or under-estimate the object behavior, which may result in abrupt acceleration or deceleration, making travel unpleasant for the rider. For example, conventional systems may not consider probabilities associated with multiple objects when determining an action or reaction while travelling in an environment, thereby leading to less than optimal efficiency and/or passenger comfort and satisfaction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
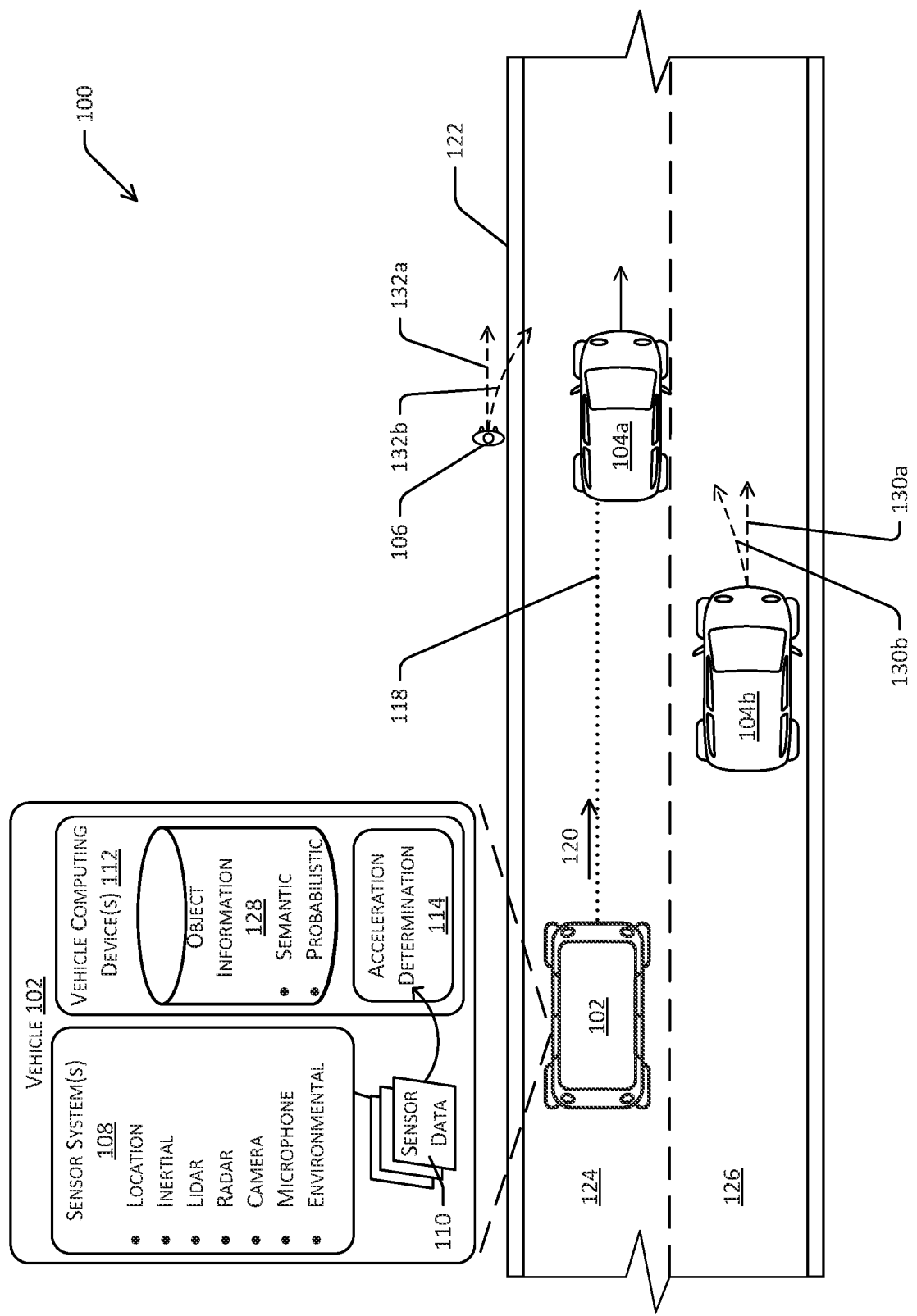
FIG. 1 is a schematic diagram illustrating an example implementation of responsive vehicle control in an environment as described herein.

Techniques described herein are directed to responsive control of a vehicle, such as an autonomous vehicle, in an environment. For example, in implementations described herein, a control (such as an acceleration, steering angle, torques, etc.) of a vehicle along a planned path may be determined by considering a plurality of different objects (e.g., dynamic obstacles, including but not limited to pedestrians, animals, cyclists, trucks, motorcycles, other vehicles, or the like) in an environment of the vehicle and the predicted actions of those objects. For example, the vehicle may be controlled at an acceleration that is a weighted average of a plurality of discrete reactions to each of a plurality of objects.

As a non-limiting example, a computing device of an autonomous vehicle may receive sensor data and determine one or more objects in an environment and/or attributes of the one or more objects in the environment. For example, the computing device may determine, for each detected object, a probability that the object will affect travel, e.g., a probability that the object will enter a travel path of the vehicle. For example, the probabilities may be determined by a prediction system using object classifications, prediction models, or the like.

The computing device may also determine accelerations of the autonomous vehicle responsive to different events. For example, the computing device may calculate a first acceleration as an acceleration at which the autonomous vehicle would traverse along a travel path in the absence of any other objects. In some examples, the first acceleration may be an acceleration to obtain or maintain a desired speed, e.g., a speed limit, or the first acceleration may be an acceleration to maintain a distance from a leading vehicle. The computing device may also calculate accelerations responsive to detected objects. For example, the computing device may determine a second acceleration at which the autonomous vehicle would proceed should a detected additional vehicle merge into traffic in front of the autonomous vehicle or a second acceleration at which the autonomous vehicle would proceed should a detected pedestrian cross the road. Thus, in some examples, the computing device may calculate as many accelerations as detected objects.

In some examples, the computing device of the autonomous vehicle may also determine a weighting factor for each of the determined accelerations. For instance, the first acceleration may have a fixed weighting factor, e.g., because that acceleration may be the default or preferred acceleration. Weighting factors for each of the second accelerations may be based on the probability that each event will occur. Continuing with the example of the detected pedestrian that may cross the road, a weighting factor associated with the second acceleration responsive to that pedestrian could be a function of the probability of the pedestrian crossing the road.

In some implementations, the control acceleration for the autonomous vehicle may be determined as a weighted average of each of the determined accelerations, using the weighting factors. Thus, for example, each of the objects may be considered in determining the control acceleration. Moreover, because the weighting factors may be functions of event probabilities, the objects may be relatively weighted.

The systems and techniques described herein are distinct from previous systems, in that previous systems merely selected a control acceleration based on a likelihood of an event occurring. For example, in previous systems, if the likelihood that the example pedestrian would cross in front of the autonomous vehicle exceeded a threshold, the vehicle would use the second acceleration responsive to that event as the control acceleration. Alternatively, if the likelihood of that pedestrian crossing was lower than the threshold, the pedestrian (and responsive acceleration) were ignored. Thus, unlike conventional systems, aspects of this disclosure may be inclusive of more events when determining a control acceleration. This inclusion may result in a smoother ride for passengers and increased safety for the autonomous vehicle and/or objects in the environment.

Techniques described herein are directed to leveraging sensor and perception data to enable a vehicle, such as an autonomous vehicle, to increase a level of safety associated with navigating through an environment while circumventing objects in the environment, in addition to providing a pleasant riding experience. Techniques described herein can utilize semantic and/or probabilistic information to determine a vehicle acceleration (and/or other controls) along a drive path such that the vehicle can travel relative to those objects in a more efficient manner and/or with increased comfort to passengers than with existing navigation techniques. For example, techniques described herein may provide a technological improvement over existing prediction and navigation technology. In addition to improving the accuracy with which sensor data can be used to determine the vehicle acceleration, techniques described herein can provide a smoother ride and improve safety outcomes by, for example, more accurately determining a safe speed at which the vehicle may operate to reach an intended destination. Techniques described herein may also reduce component wear and energy requirements associated with the vehicle. For example, existing techniques may more harshly brake and/or accelerate, putting additional and unnecessary stress on vehicle components.

Figure 2:
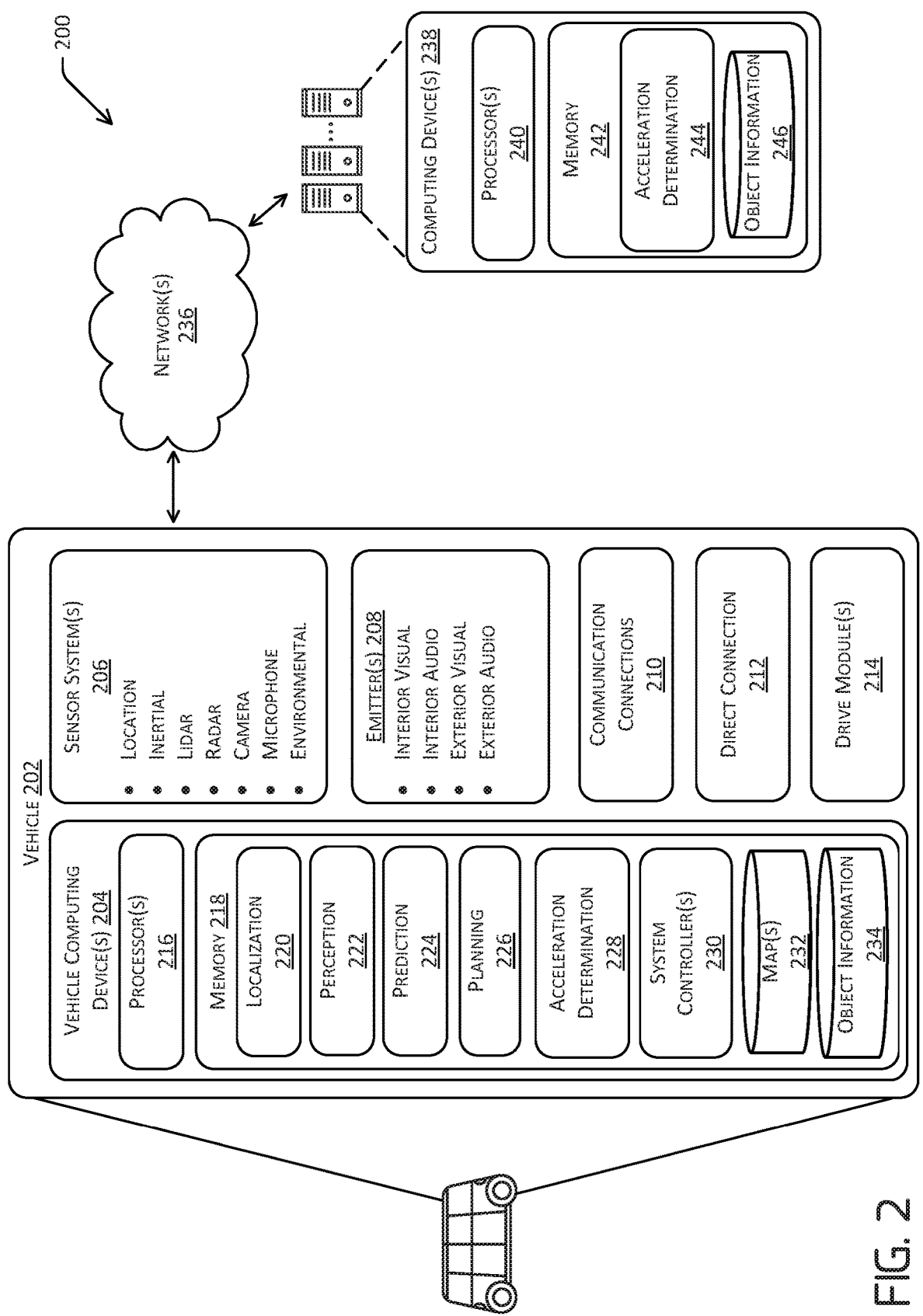
FIG. 2 is a block diagram illustrating an example computing system for responsive vehicle control as described herein.
Figure 3:
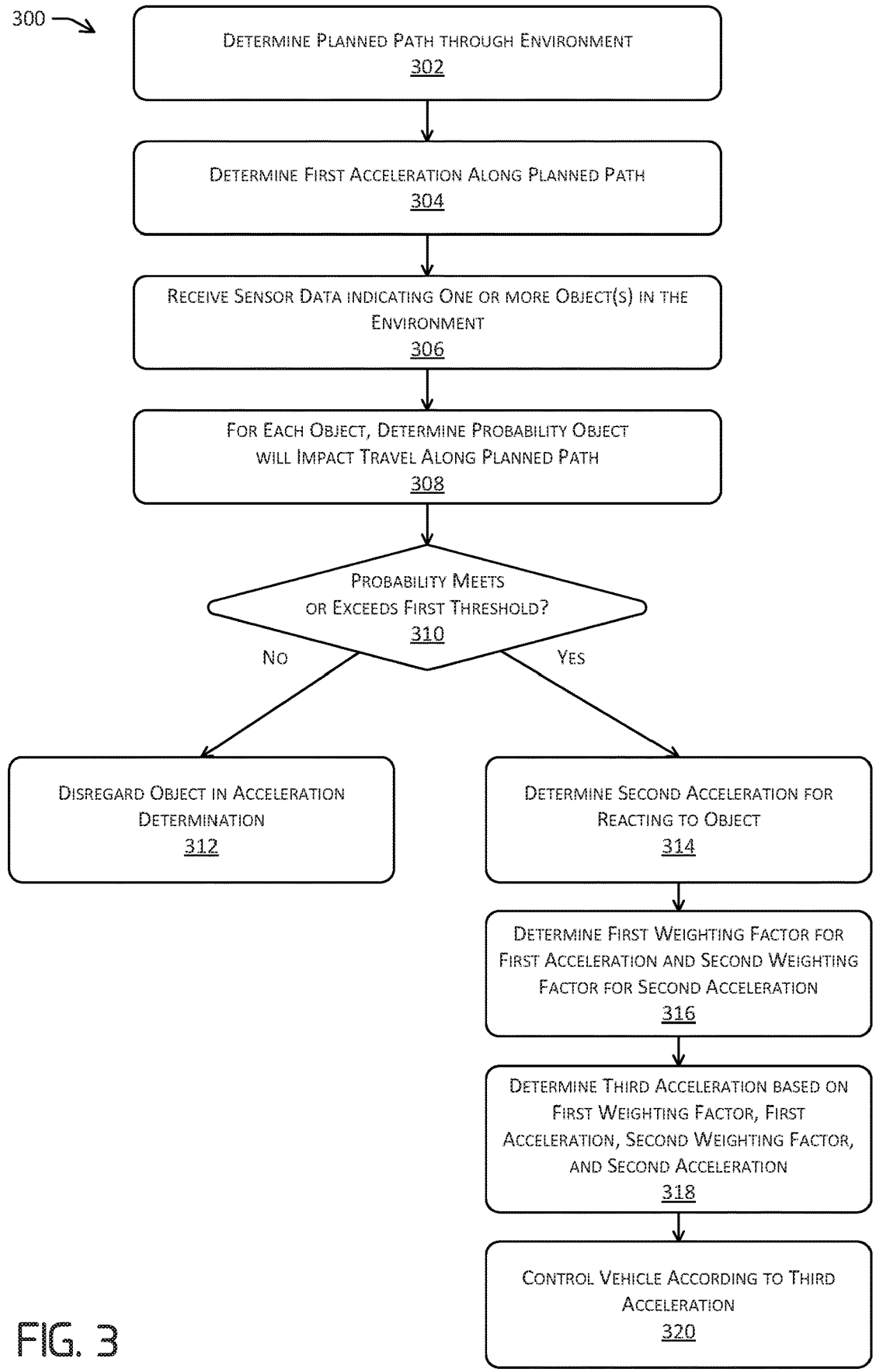
FIG. 3 is a flowchart illustrating an example method for navigating a vehicle through an environment using responsive vehicle control, as described herein.

FIGS. 1-3 provide additional details associated with techniques described herein.

FIG. 1 is a schematic diagram illustrating an example implementation of responsive control of a vehicle through an environment as described herein. More specifically, FIG. 1 illustrates an example environment 100 in which a vehicle 102 is operating. In the illustrated example, the vehicle 102 is driving in the environment 100, although in other examples the vehicle 102 may be stationary and/or parked in the environment 100. One or more objects, or agents, also are in the environment 100. For instance, FIG. 1 illustrates two additional vehicles 104a, 104b (collectively, the "additional vehicles 104") and a pedestrian 106. Although not illustrated, any number and/or type of objects, including static objects, e.g., road signs, parked vehicles, fire hydrants, buildings, curbs, or the like, and/or dynamic objects, e.g., pedestrians, animals, cyclists, trucks, motorcycles, other vehicles, or the like, can additionally or alternatively be present in the environment 100.

The vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In the example of FIG. 1, the vehicle 102 can be associated with one or more sensor systems 108. The sensor system(s) 108 can generate sensor data 110, which can be utilized by one or more vehicle computing devices 112 associated with the vehicle 102 to recognize the one or more objects, e.g., the additional vehicles 104 and/or the pedestrian 106. The sensor system(s) 108 can include, but is/are not limited to, light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), time of flight sensors, cameras (e.g., RGB, IR, intensity, depth, etc.), wheel encoders, microphones, environment sensors (e.g., temperature sensors, humidity sensors, light sensors, pressure sensors, etc.), etc.

In at least one example, the vehicle computing device(s) 112 can include a perception system, which can perform object detection, segmentation, and/or classification based at least in part on the sensor data 110 received from the sensor system(s) 108. For instance, the perception system can detect the additional vehicles 104 and/or the pedestrian 106 in the environment 100 based on the sensor data 110 generated by the sensor system(s) 108. Additionally, the perception system can determine an extent of the additional vehicles 104 and/or the pedestrian 106 (e.g., height, weight, length, etc.), a pose of the additional vehicles 104 and/or the pedestrian 106 (e.g., x-coordinate, y-coordinate, z-coordinate, pitch, roll, yaw), and/or additional attributes of the additional vehicle 104 and/or the pedestrian 106. The sensor system(s) 108 can continuously generate the sensor data 110 (e.g., in near-real time), which can be utilized by the perception system (and/or other systems of the vehicle computing device(s) 112).

The vehicle computing device(s) 112 can also include an acceleration determination system 114, which, as described further herein, can determine a control acceleration at which the vehicle 102 is to proceed. The control acceleration may be an acceleration for the vehicle 102 at which the vehicle 102 can travel safely through the environment 100, e.g., relative to the additional vehicles 104, the pedestrian 106, and/or other objects. In some implementations, the control acceleration may be an acceleration along a travel path 118, which travel path 118 may be determined by the vehicle computing device(s) 112 as a path along which the vehicle 102 may travel through the environment 100. In some instances, and as further described herein, the planner system can determine the travel path based at least in part on the sensor data 110 received from the sensor system(s) 108 and/or any determinations made by a perception system. For instance, the planning system can determine the travel path 118 as a route to navigate safely through the environment relative to the additional vehicles 104 and the pedestrian 106, as identified by the perception system.

More specifically, FIG. 1 illustrates a scenario in which the vehicle 102 is travelling through the environment 100, generally in the direction of arrow 120. The vehicle 102 is travelling on a road 122 having a first lane 124 and a second lane 126. The vehicle 102 is in the first lane 124, behind the first additional vehicle 104a, and, in the example, may be travelling relatively the same speed as the first additional vehicle 104a. For example, the vehicle 102 may be controlled to maintain a relatively constant distance from the rear of the first additional vehicle 104a. For instance, the vehicle computing device(s) 112 may receive sensor data 110 indicative of a position and/or movement of the first additional vehicle 104a and generate controls for maintaining the predetermined distance. In examples of this disclosure, at least a portion of the controls may include an acceleration of the vehicle 102, e.g., the control acceleration determined by the acceleration determination system 114. Thus, if the sensor data 110 indicates that the distance between the vehicle 102 and the first additional vehicle 104a is decreasing, the vehicle computing device(s) 112 may generate a control to decelerate.

In the example illustrated in FIG. 1, in addition to using information about the first additional vehicle 104a, the acceleration determination system 114 may also include information about additional objects in the environment, including but not limited to the second additional vehicle 104b and/or the pedestrian 106, to determine the control acceleration for the vehicle 102. In some implementations, the acceleration determination system 114 may also consider object information 128, which may include information about semantic classifications and/or probabilistic models. In implementations described herein, the vehicle computing device(s) 112, using the sensor data 110 and/or the agent information 128, may determine information about objects in the environment 100, which may include the first additional vehicle 104a, the second additional vehicle 104b, the pedestrian 106, and/or additional objects. For example, and as will be described further herein, the vehicle computing device(s) 112, using the acceleration determination system 114, may consider information about each of the objects, including the object information 128, to determine a probability that each object will enter the drive path 118 and determine the control acceleration for the vehicle 102 based at least in part on those probabilities.

With further reference to FIG. 1, the second additional vehicle 104b may be travelling in the second lane 126, and may take a number of actions. For example, the second additional vehicle 104b could proceed along a first vehicle trajectory 130a, which would maintain the second additional vehicle 104b in the second lane 126. The second additional vehicle 104b may follow the first vehicle trajectory 130a to pass the first additional vehicle or to be passed by the vehicle 102, for instance. In other examples, the second additional vehicle 104b may proceed along a second vehicle trajectory 130b, along which the second additional vehicle may change from the second lane 126 to the first lane 124. Along this second vehicle trajectory 130b, the second additional vehicle 104b could attempt to merge into the first lane 124, e.g., by merging behind the first additional vehicle 104a and in front of the vehicle 102. Similarly, the pedestrian 106 may take any of a number of actions. For instance, the pedestrian 106 may proceed along a first pedestrian trajectory 132a, e.g., generally along the side of the road, or may proceed along a second pedestrian trajectory 132b, e.g., along which the pedestrian 106 would veer into the first lane 124. As may be appreciated, should the vehicle computing device(s) 112 determine that the second additional vehicle 104b is to proceed along the first vehicle trajectory 130a and that the pedestrian 106 is to proceed along the first pedestrian trajectory 132a, the vehicle 102 may be controlled by ignoring the first additional vehicle 104a and the pedestrian 106, e.g., to maintain vehicle 102 at the predetermined distance from the first additional vehicle 104a as discussed above. Alternatively, should the vehicle computing device(s) 112 determine that the second additional vehicle 104b is likely to proceed along the second vehicle trajectory 130b and/or that the pedestrian 106 is likely to proceed along the second pedestrian trajectory 132b, e.g., into the travel path 118, the vehicle 102 may be controlled to decelerate, e.g., to allow the second additional vehicle 104b into the first lane 124 and/or to continue to proceed with caution relative to the pedestrian 106.

As described further herein, the vehicle computing device(s) 112 may be configured to determine probabilities associated with the second additional vehicle 104b travelling along the first vehicle trajectory 130a or the second vehicle trajectory 130b and probabilities associated with the pedestrian 106 travelling along the first pedestrian trajectory 132a or the second pedestrian trajectory 132b. Based on these probabilities, the acceleration determination system 114 may determine an acceleration for the vehicle 102 that takes into account the first additional vehicle 104a, the second additional vehicle 104b, and the pedestrian 106. In instances in which additional objects are detected and identified in the environment 100, those objects may also be considered when determining the control acceleration. Thus, the vehicle 102 is controlled to accelerate along the travel path in accordance with information about a plurality of objects in the environment. In some implementations, semantic information about the objects may be used to determine the trajectories (e.g., the trajectories 130a, 130b, 132a, 132b), the likelihoods that the respective objects will follow those trajectories, the speed and/or acceleration at which the vehicles are likely to follow those trajectories, or the like. Thus, in FIG. 1, the pedestrian 106 may be associated with a first classification and the additional vehicles 104 may be associated with one or more second classifications. Moreover, vehicles within the second classification(s) may be further classified as static, as in the case of a parked vehicle, or dynamic, as in the case of the additional vehicles 104a, 104b. In further examples, probabilistic information about the objects may also or alternatively be used to determine the likelihood that the additional vehicles 104 and/or the pedestrian follows the trajectories. For example, there may be some uncertainty associated with the actions of the moving pedestrian 106 and/or the moving additional vehicles 104a, 104b, e.g., because the pedestrian 106 or the drivers of the additional vehicles 104a, 104b may change course. Probabilistic information may also be used to account for sensor inaccuracies, e.g., associated with the sensor system(s) 108.

In the example of FIG. 1, the first and second vehicle trajectories 130a, 130b and the first and second pedestrian trajectories 132a, 132b are shown for illustration only. The second additional vehicle 104b and/or the pedestrian 106 may proceed along any number of trajectories. In practice, the vehicle computing device(s) 112, e.g., using a perception system, a planning system, and/or the acceleration determination system 114, may consider any number of trajectories for objects in the environment 100. In some implementations, the vehicle computing device(s) 112 may determine a single probability for each object, e.g., a probability that the object will interfere with travel of the vehicle 102, and may weight accelerations associated with navigating relative to each of the objects using the probabilities. For example, the probability may be the probability associated with the one trajectory or action (of multiple trajectories or actions) having the highest probability of impacting travel of the vehicle 102. In some conventional examples, if it was determined that a probability that the second additional vehicle 104b was going to switch lanes, e.g., by following the second vehicle trajectory 130b, exceeded a threshold probability, the vehicle would decelerate at a predetermined rate, e.g., to maintain a safe distance from the merging second additional vehicle 104b allowing it to merge naturally and safely. Alternatively, in these conventional systems, if the probability that the second additional vehicle 104b was going to switch lanes was determined to be below the threshold probability, the vehicle computing device(s) 112 would disregard the second additional vehicle 104b, and generate controls to maintain the distance from the first additional vehicle 104a. Thus, conventional systems which instituted a binary approach (e.g., brake to allow the second additional vehicle 104b to merge or disregard the second additional vehicle 104b entirely and accelerate to follow the first additional vehicle 104a) often resulted in abrupt acceleration and deceleration, particularly when the second additional vehicle 104b is drifting in the second lane 126 or making similar unorthodox maneuvers. In contrast, in implementations detailed further herein, a probability that each object is likely to impact or enter the travel path 118 may be used to weight a responsive acceleration, and the weighted accelerations may be averaged to determine an acceleration for controlling the vehicle 102.

FIG. 1 illustrates a single example of navigating an environment using acceleration determination techniques. Other examples also are contemplated. For example, although FIG. 1 illustrates two possible events, e.g., a potentially-merging vehicle and a nearby pedestrian, additional events also are contemplated. For example, a vehicle entering the road 122, e.g., from a driveway or an intersecting street, zipper merges on highways, and the like may be considered according to techniques described herein. Any object or event that could impact the travel of the vehicle 102 along the travel path 118 may be used to consider the control acceleration. Several other examples are discussed further herein.

FIG. 2 is a block diagram illustrating an example system 200 for implementing responsive control of a vehicle through an environment as described herein. In at least one example, the system 200 can include a vehicle 202, which can be the same as the vehicle 102 described above with reference to FIG. 1. The vehicle 202 can include one or more vehicle computing devices 204, one or more sensor systems 206 (which may be the sensor system(s) 108), one or more emitters 208, one or more communication connections 210, at least one direct connection 212, and one or more drive modules 214. In at least one example, the vehicle computing device(s) 204 can correspond to the vehicle computing device(s) 112 described above with reference to FIG. 1.

The vehicle computing device(s) 204 can include processor(s) 216 and memory 218 communicatively coupled with the processor(s) 216. In the illustrated example, the vehicle 202 is an autonomous vehicle; however, the vehicle 202 could be any other type of vehicle. In the illustrated example, the memory 218 of the vehicle computing device(s) 204 stores a localization system 220, a perception system 222, a prediction system 224, a planning system 226, an acceleration determination system 228, and one or more system controllers 230. Although these systems and components are illustrated, and will be described below, as separate components for ease of understanding, functionality of the various systems and controllers may be attributed differently than discussed. By way of non-limiting example, functionality attributed to the perception system 222 may be carried out by the localization system 220 and/or the prediction system 224. Fewer or more systems and components may be utilized to perform the various functionalities described herein. Furthermore, though depicted in FIG. 2 as residing in memory 218 for illustrative purposes, it is contemplated that the localization system 220, the perception component 222, the prediction system 224, the planning system 226, the acceleration determination component 228, and/or the one or more system controllers 230 can additionally, or alternatively, be accessible to the vehicle 202 (e.g., stored on, or otherwise accessible by, memory remote from the vehicle 202).

As also illustrated in FIG. 2, the memory 218 can include a map storage 232 and/or object information storage 234. The map storage 232 may store one or more maps, and the object information storage 234 may store the object information 128. A map can be any number of data structures modeled in two dimensions or three dimensions that are capable of providing information about an environment, such as, but not limited to, topologies (such as intersections), streets, mountain ranges, roads, terrain, and the environment in general. As discussed further herein, the object information 128 may be any information about objects, including, without limitation, information that is useful for interpreting sensor data to classify or otherwise understand objects in the environment. By way of non-limiting example, the object information 128 may include information used to identify, classify, and/or otherwise understand an object in the environment 100.

In at least one example, the localization system 220 can include functionality to receive data from the sensor system(s) 206 to determine a position and/or orientation of the vehicle 202 (e.g., one or more of an x-, y-, z-position, roll, pitch, or yaw). For example, the localization system 220 can include and/or request/receive a map of an environment (e.g., from the map storage 232) and can continuously determine a location and/or orientation of the vehicle 202 within the map. In some instances, the localization system 220 can utilize SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, radar data, IMU data, GPS data, wheel encoder data, and the like to accurately determine a location of the autonomous vehicle. In some instances, the localization system 220 can provide data to various components of the vehicle 202 to determine an initial position of an autonomous vehicle for generating a candidate trajectory for travelling in the environment.

In some instances, the perception system 222 can include functionality to perform object detection, segmentation, and/or classification. In some examples, the perception system 222 can provide processed sensor data that indicates a presence of an object that is proximate to the vehicle 202, such as the additional vehicles 104a, 104b and/or the pedestrian 106. The perception system 222 may also determine a classification of the entity as an entity type (e.g., car, pedestrian, cyclist, animal, building, tree, road surface, curb, sidewalk, unknown, etc.). For instance, the perception system 222 may compare sensor data to the object information 128 in the object information database 234 to determine the classification. In additional and/or alternative examples, the perception system 222 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

The prediction system 224 can access sensor data from the sensor system(s) 206, map data from the map storage 232, and, in some examples, perception data output from the perception system 222 (e.g., processed sensor data). In at least one example, the prediction system 224 can determine features associated with the object based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, the prediction system 224 may be configured to determine a distance between an object and a proximate driving lane, a width of a current driving lane, proximity to a crosswalk, semantic feature(s), interactive feature(s), etc.

The prediction system 224 can also analyze features of objects to predict future actions of the objects. For instance, the prediction system 224 can predict lane changes, decelerations, accelerations, turns, changes of direction, or the like. The prediction system 224 can send prediction data to the acceleration determination system 228 so that the acceleration determination system 228 can, using the prediction data, determine an appropriate acceleration for controlling the vehicle 202 along a travel path, such as the travel path 118. For instance, the prediction system 224 can generate prediction data indicative of a likelihood that an object will enter the travel path 118 and/or otherwise interfere with a current path and/or trajectory of the vehicle 202. In some examples, the prediction data may be a numerical probability, e.g., from 0 to 1.0 that the object will enter the travel path 118 and information about the acceleration and/or speed of the object. In some examples, the prediction system 224 may provide an indication (e.g., an audio and/or visual alert, e.g. via one or more of the emitter(s) 208) to the object and/or to a passenger (or driver when the vehicle 202 is not fully autonomous) when it is determined that the object may affect travel.

In general, the planning system 226 can determine a path, e.g., the travel path 118, along which the vehicle 202 can traverse through an environment. For example, the planning system 226 can determine various routes and trajectories and various levels of detail. The planning system 226 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning system 226 can generate an instruction for guiding the autonomous vehicle along at least a portion of the route from the first location to the second location. In at least one example, the planning system 226 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate. Thus, in example implementations described herein, the planning system 226 may generate trajectories along which the vehicle can navigate, with the trajectories being along the travel path 118.

The acceleration determination system 228 is configured to determine an acceleration at which the vehicle 202 is to be controlled along a travel path, such as the travel path 118. Although illustrated as a separate block in the memory 218, in some examples and implementations, the acceleration determination system 228 may be a part of the planning system 226. The acceleration determination system 228 can access sensor data from the sensor system(s) 206, map data from the map storage 232, object information from the object information store 234, and/or outputs from one or more of the localization system 220, the perception system 222, and/or the prediction system 224 (e.g., processed data). By way of non-limiting example, the acceleration determination system 228 may access (e.g., retrieve or receive) a probability that each object in the environment will impact travel of the vehicle 202. For instance, and as discussed above, the prediction system 224 may determine for each object a probability, e.g., a numerical value from 0.0 to 1.0, that the object will enter the travel path 118, and provide those probabilities to the acceleration determination system 228. The acceleration determination system 228 may use these probabilities to determine an acceleration at which to control the vehicle 202. For instance, and with reference to FIG. 1, the acceleration determination system 228 may receive (or retrieve) a first probability that the second additional vehicle 104b will change lanes, e.g., enter the first lane 124 in front of the vehicle 102, and a second probability that the pedestrian 106 will enter the road 122. In at least some examples, such a prediction system 224 may also assign a unique probability for each potential action an object may take. As a non-limiting example, such probabilities may comprise a first probability an object will change lanes and a second probability the object will continue along its current course.

The acceleration determination system 228 may determine which objects to include in, and/or which objects to exclude from, its acceleration determination. For example, the acceleration determination system 228 may exclude or ignore information about objects having a probability of interfering with travel of the vehicle below a threshold value. Considering FIG. 1, if the sensor data 110 indicates that the second additional vehicle 104b has a turn signal indicating a right turn, and there is an upcoming intersection with an available right turn, the probability of the second additional vehicle continuing along an interfering trajectory, like the second vehicle trajectory 130b, may be relatively low. In this example case, then, the predictions system 224 may determine that the second additional vehicle has a 0.1 probability of travelling into the travel path 118. Because the probability is relatively low, the acceleration determination system 228 may ignore the second additional vehicle 104b altogether in this example (although in other examples, the second additional vehicle 104b may have a low weighting factor, as discussed further herein). Although not limiting, the acceleration determination system 228 may exclude information about objects (and/or thresholds associated with potential actions of such objects) having a probability of less than about 0.4, although higher or lower thresholds may be used. Moreover, although this example describes the acceleration determination system 228 as identifying which objects to include in the acceleration determination, in other implementations the acceleration determination system 228 may only receive (or retrieve) information about objects that meet or exceed the threshold probability.

The acceleration determination system 228 may also determine accelerations associated with each of the objects. Using FIG. 1 as an example, the acceleration determination system 228 may determine a first acceleration (e.g., which may be a deceleration) at which the vehicle 102 would be controlled in the event the second additional vehicle 104b enters the first lane 124. The acceleration determination system 228 may also determine a second acceleration at which the vehicle 102 would be controlled in the event the pedestrian 106 walks onto the road 122. The first and second accelerations may be determined based on a number of factors, including but not limited to semantic information about the objects, probabilistic information about the objects, a relative distance of the vehicle 102 to the object, a velocity of the object relative to the vehicle 102, a classification of the objects, models associated with objects, including predetermined models and modeling conducted in near-real time. In such an example, the acceleration determination system 228 may output a unique acceleration associated with each detected object (and/or those having an associated probability above a threshold) to safely interact with the detected object. As a non-limiting example, the acceleration determination system 228 may output a first acceleration associated with the vehicle 104a, a second acceleration associated with the second vehicle 104b, and a third acceleration associated with the pedestrian 106.

In addition to determining the accelerations, the acceleration determination system 228 may also determine weighting factors for each of the accelerations. The weighting factors may be based on the probabilities that the object will enter the vehicle path 118, described above. For instance, the probability that the second additional vehicle 104b enters the first lane 124 may be higher than the probability that the pedestrian 106 walks into the road 122, and, correspondingly, a weighting factor associated with the first acceleration may be greater than a weighting factor associated with the second acceleration. For example, the weighting factor may be a function, e.g., a linear function, an exponential function or other higher-order function, etc., of the probability. In other examples, the weighting factors may be based at least in part on a type or classification of an object. For instance, other vehicles in the road may have lower or higher weighting factors than do pedestrians, animals, and/or other object types. Moreover, the weighting factors may be determined based at least in part on a confidence associated with the object. In some implementations, the acceleration determination system 228 may also determine a weighting factor associated with an acceleration at which the vehicle 102 would proceed in the absence of any objects. In the example of FIG. 1, such an acceleration may be the acceleration for following the first additional vehicle 104a. In other examples, the acceleration may be an acceleration necessary to achieve and/or maintain a desired speed, e.g., a speed limit.

Using information about the objects, acceleration(s) for navigating relative to those and/or other objects, and/or weighting factors associated with the probabilities of events, the acceleration determination system 228 can determine an acceleration at which to control the vehicle 102, 202, e.g., a control acceleration. For example, the acceleration determination system 228 may determine the acceleration as a weighted average of the acceleration of all objects considered. Thus, in the example of FIG. 1 and continuing the discussion above, the acceleration determination system 114 may calculate a weighted average of the first acceleration (e.g., the acceleration responsive to the second additional vehicle 104b entering the first lane 124), the second acceleration (e.g., the acceleration responsive to the pedestrian 106 walking closer to the road 122), and the acceleration for following the first additional vehicle 104a. This weighted-average approach is different from conventional systems, in which one of the accelerations may be chosen, e.g., because it is associated with a highest probability, and applied to control the vehicle 102, which can result in abrupt acceleration and braking.

In some examples, the acceleration determination system 228 may determine the acceleration by optimizing Equation (1):

$$a_x^*(t) = \underset{a_x^*(t)}{\operatorname{argmin}} \left[ R_t(a_x(t) - a_x^*(t-1))^2 + \sum_{\varepsilon=0}^{n_{active\ subgoals}} R_s(a_x(t) - a_s)^2 \right] \quad (1)$$

$$\min\{\max\{\{a_x^*(t), a_{max}\}, a_{min}\} \text{ where}$$

$$\{a_{min}, a_{max}\} \text{ is the union of active sets}$$

Equation (1) generally represents an optimization for determining a control acceleration $a_x^*(t)$ (e.g., the acceleration at which the vehicle will be controlled in the environment in the longitudinal, x, direction at a time, t). The control acceleration determined by optimizing Equation (1) may provide the minimum deviation from each of the candidate accelerations (e.g., for each of n active subgoals, which may be objects or events, such as the pedestrian 104 or the cut-in event associated with the pedestrian 104 or the vehicle 104b or the cut-in event associated with the vehicle 104b). In Equation (1), the summation term generally includes the term $R_s$, which represents the weighting factor for the respective event (e.g., maintaining the distance from the first additional vehicle 104a, the second additional vehicle 104b changing lanes, the pedestrian 106 entering the road 122, or the like) and $a_s$, which represents the acceleration for the event. Equation (1) uses L2 norms of the difference between the accelerations, e.g., $a_x(t)$ and $a_s$. When the L2 norm is used, and absent any constraints, the optimization of the Equation (1) may be a weighted average of each of the acceleration values, e.g., weighted by the weighting factors. Although Equation (1) is illustrated as using L2 norms, other functions may also be used. For example, L1 norms or L-infinity norms could be used, exponentials, polynomials, and the like. In still other examples, the optimization could include a hard constraint, e.g., a rule that the acceleration has to be greater than or less than some predetermined acceleration.

Equation (1) may also include the term $R_t(a_x(t)-a_x^*(t-1))^2$, which may be a smoothing term weighted by factor $R_t$ that takes into account an acceleration in a previous time step (a subgoal in which deviation from a previous control acceleration are penalized, promoting smooth control). In implementations described herein, the summation term may consider all events that are above a threshold probability. As set forth, Equation (1) may also require that the control acceleration be between certain minimum and maximum accelerations. For instance, the equation may require that acceleration falls within a range between a minimum acceleration and a maximum acceleration. As a brief example, in a scenario in which the vehicle 102 may be stopping for a stop sign, $a_{max}$ may be the maximum acceleration that ensures the vehicle 102 stops in time. However, the techniques may choose a smaller $a_x$ (e.g., to a minimum acceleration, $a_{min}$) if other events are present. As each event is considered in the equation (1), the techniques described herein consider the overlap between the events (e.g., the $a_{min}$ and $a_{max}$ values) and may default to the most conservative case. Thus, for each event, $a_{x\_min}=\min(a_{x\_min}, a_{x\_event\_min})$ and $a_{x\_max}, a_{x\_event\_max})$. Equation (1) may require that the final $ax^*(t)$ is within this bound. For example, the use of this range may reduce computational load compared to placing explicit constraints on the optimization problem, which may require an iterative solver.

Because of the changing nature of the environment, e.g., because the vehicle and dynamic objects are moving, new objects may enter the environment, or the like, the acceleration for controlling the vehicle may be performed substantially continuously, e.g., at fixed iterations. For example, Equation (1) may be solved in near real time, e.g., at intervals of from about 0.5 seconds to about 3 seconds. With each iteration, addition, fewer, and/or different objects and/or events may be considered, e.g., as the probability that those objects/events will impact travel of the vehicle 102 changes. Moreover, each iterative acceleration determination may be based on current information, e.g., a current state of the environment, and/or on a future prediction of the environment 100. For example, controls for the vehicle 102 may be based on a forward-in-time-looking decision horizon. In some implementations, the vehicle computing device(s) 202, e.g., implementing the prediction system 224, the planning system 226, and/or the acceleration determination system 228 may consider discrete times in a decision horizon, which may be less than 1 second to several seconds or more. At each discrete time step, the vehicle computing device(s) 204 may determine a reaction for the vehicle based on information about static objects in the environment, e.g., based on an assumption that such objects will remain static, and predictions of dynamic entities, e.g., determined by the prediction system 224. Thus, at each time step, the vehicle computing device(s) 204, e.g., the planning system 226, may evaluate a position of the vehicle, positions of other dynamic objects, and positions of the static objects. A reaction (e.g., the acceleration for traversing along the drive path 118) at each of these time steps may then be considered by the acceleration determination system 228 to determine the control acceleration for the vehicle 202. Additional examples of the functioning of the acceleration determination system 228 are described further herein, including in connection with FIG. 3, below.

While the acceleration determination system 228 is illustrated as being separate from the planning system 226, one or more of the functionalities of the acceleration determination system 228 may be carried out by the planning system 226. In some embodiments, the acceleration determination system 228 may be a part of the planning system 226.

In at least one example, the localization system 220, the perception system 222, the prediction system 224, the planning system 226, and/or the acceleration determination system 228 can process sensor data, as described above, and can send their respective outputs over network(s) 236, to computing device(s) 238. In at least one example, the localization system 220, the perception system 222, the prediction system 224, and/or the planning system 226 can send their respective outputs to the computing device(s) 238 at a particular frequency, after a lapse of a predetermined period of time, in near real-time, etc.

In at least one example, the vehicle computing device(s) 204 can include one or more system controllers 230, which can be configured to control steering, propulsion, braking, safety, emitters, communication, and other systems of the vehicle 202. These system controller(s) 230 can communicate with and/or control corresponding systems of the drive module(s) 214 and/or other components of the vehicle 202. For example, the system controllers 230 may cause the vehicle to traverse along a drive path determined by the planning system 226, e.g., at an acceleration determined by the acceleration determination system 228.

In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device(s) 204. Additionally and/or alternatively, the sensor system(s) 306 can send sensor data, via the network(s) 236, to the computing device(s) 238 at a particular frequency, after a lapse of a predetermined period of time, in near real-time, etc.

The vehicle 202 can also include one or more emitters 208 for emitting light and/or sound. The emitter(s) 208 in this example can include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 in this example also include exterior emitters. By way of example and not limitation, the exterior emitters can include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., or the like. In at least one example, the emitter(s) 208 can be disposed at various locations about the exterior and/or interior of the vehicle 202.

The vehicle 202 can also include communication connection(s) 210 that enable communication between the vehicle 202 and other local or remote computing device(s). For instance, the communication connection(s) 210 can facilitate communication with other local computing device(s) on the vehicle 202 and/or the drive module(s) 214. Also, the communication connection(s) 310 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 232. For example, the communications connection(s) 210 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 202 can include drive module(s) 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include sensor system(s) to detect conditions of the drive module(s) 214 and/or the surroundings of the vehicle 202. By way of example and not limitation, the sensor system(s) 206 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 214. In some cases, the sensor system(s) on the drive module(s) 214 can overlap or supplement corresponding systems of the vehicle 202 (e.g., the sensor system(s) 206).

The drive module(s) 214 can include many of the vehicle systems, including a high voltage battery, a motor to propel the vehicle 202, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 214. Furthermore, the drive module(s) 214 also include communication connection(s) that enable communication by the respective drive module with other local or remote computing device(s).

As described above, the vehicle 202 can send sensor data to the computing device(s) 238, via the network(s) 236. In some examples, the vehicle 202 can send raw sensor data to the computing device(s) 238. In other examples, the vehicle 202 can send processed sensor data and/or representations of sensor data to the computing device(s) 238 (e.g., data output from the localization system 220, the perception system 222, the prediction system 224, and/or the planning system 226). In some examples, the vehicle 202 can send sensor data to the computing device(s) 238 at a particular frequency, after a lapse of a predetermined period of time, in near real-time, etc.

The computing device(s) 238 can receive the sensor data (raw or processed) from the vehicle 202 and/or one or more other vehicles and/or data collection devices, and can determine a drive envelope based on the sensor data and other information. In at least one example, the computing device(s) 238 can include processor(s) 240 and memory 242 communicatively coupled with the processor(s) 240. In the illustrated example, the memory 242 of the computing device(s) 238 stores an acceleration determination component 244 and agent information storage 246, for example. In at least one example, the object information storage 246 can correspond to the object information storage 234 and/or the object information storage 128.

The acceleration determination component 244 may correspond to the acceleration determination system 228 described above. For example, the acceleration determination component 244 may process data to determine an acceleration for the vehicle 202 to traverse along a drive path. For example, the acceleration may be determined at the computing device(s) 238 and transferred back to the vehicle 202, e.g., via the networks 236. Moreover, the acceleration determination component 244 can perform one or more operations as described above and ascribed to the localization system 220, the perception system 222, the prediction system 224, and/or the planning system 226.

The processor(s) 216 of the vehicle 202 and the processor(s) 240 of the computing device(s) 238 can be any suitable processor capable of executing instructions to process data and perform operations as described herein. By way of example and not limitation, the processor(s) 216 and 240 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 242 are examples of non-transitory computer-readable media. Memory 218 and 242 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 2 is illustrated as a distributed system, in alternative examples, components of the vehicle 202 can be associated with the computing device(s) 238 and/or components of the computing device(s) 238 can be associated with the vehicle 202. That is, the vehicle 202 can perform one or more of the functions associated with the computing device(s) 238, and vice versa. Moreover, although various systems and components are illustrated as being discrete systems, the illustrations are examples only, and more or fewer discrete systems may perform the various functions described herein.

FIG. 3 is a flowchart showing an example method involving acceleration determination as described herein. Specifically, FIG. 3 illustrates a method 300 in which objects in the environment are used to determine an acceleration of a vehicle along a drive path. The method illustrated in FIG. 3 is described with reference to the vehicles 102 and/or 202 shown in FIGS. 1 and 2 for convenience and ease of understanding. However, the method illustrated in FIG. 3 is not limited to being performed using the vehicles 102, 202, and can be implemented using any of the other vehicles described in this application, as well as vehicles other than those described herein. Moreover, the vehicles 102, 202 described herein are not limited to performing the method illustrated in FIG. 3.

The method 300 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the method 300 can be combined in whole or in part with other methods.

FIG. 3 is a flowchart illustrating an example method 300 for determining an acceleration for traversing in an environment along a planned path, as described herein.

At 302, the method 300 can include determining a planned path through an environment. For example, and as described above, a vehicle 202 may include or be associated with one or more computing devices 204 that include the planning system 226. The planning system 226 may receive information from one or more sensor systems 206, the localization system 220, the perception system 222, the prediction system 224, the maps 232, and/or other sources to determine the drive path 118 along which the vehicle traverses through the environment 100.

At 304, the method 300 can include determining a first acceleration along the planned path. In the example illustrated in FIG. 1 and discussed above, the vehicle computing device 112 may determine that the vehicle 102 should maintain a predetermined distance behind the first additional vehicle 104a. Sensor data 110 from the sensor system(s) 108 may be used to determine a pose, a position, a velocity, an acceleration, and/or other information about the first additional vehicle 104a, and the acceleration determination system 114 may determine an acceleration required to maintain the predetermined distance. For example, when the first additional vehicle 104a accelerates away from the vehicle 102, the acceleration determination system 114 may generate a command to accelerate along with the first additional vehicle 104a. Similarly, when the first additional vehicle 104a brakes, the acceleration determination system 114 may generate a command to decelerate the vehicle 102. Although this example contemplates maintaining a predetermined distance between the vehicle 102 and the first additional vehicle 104a, modifications are contemplated. By way of non-limiting example, instead of a single predetermined distance between the vehicle 102 and the first additional vehicle 104a, the distance-to-be-maintained may vary based on the velocity of the first additional vehicle 104a. For instance, the vehicle 102 may be controlled to maintain a greater distance behind the first additional vehicle 104a at relatively higher speeds and a smaller distance at relatively slower speeds. In other implementations, the acceleration of the vehicle may be determined independent of the first additional vehicle 104a. For example, when the first additional vehicle 104a is not present or is exceeding a threshold speed, the vehicle 102 may be controlled to travel at the speed limit or some other speed along the travel path 118.

At 306, the method 300 can include receiving sensor data indicating an object in the environment. As described above, the vehicle 202 can include sensor system(s) 206 capable of generating sensor data about objects, including the additional vehicles 104 and the pedestrian 106. In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can provide input to the vehicle computing device(s) 204, and one or more systems of the vehicle computing device(s) 204 can utilize the input. For instance, the vehicle computing device(s) 204 can receive the input for processing by the localization system 220, the perception system 222, the prediction system 224, the planning system 226, and/or the acceleration determination system 228. As described above, in at least one example, the vehicle 202 can send sensor data to the computing device(s) 238, via the network(s) 236. In some examples, the vehicle 202 can send raw sensor data to the computing device(s) 238. In other examples, the vehicle 202 can send processed sensor data and/or representations of sensor data to the computing device(s) 238 (e.g., data output from the localization system 220, the perception system 222, the prediction system 224, and/or the planning system 226). In some examples, the vehicle 202 can send sensor data to the computing device(s) 238 at a particular frequency, after a lapse of a predetermined period of time, in near real-time, etc. Based on the sensor data, the vehicle computing devices 204 may, e.g., via image processing, vision detection, classification and/or segmentation, LIDAR detection, segmentation, and/or classification, and/or other processes, recognize the objects. In addition to the example objects discussed herein, techniques may also determine additional details about the environment and/or features in the environment.

At 308, the method 300 can include determining, for each object, a probability that the object will impact the planned path. As discussed above, the prediction system 224 may use sensor data generated by the sensor system(s) 206, object information 234, and/or additional information to determine a likelihood that each object will affect travel of the vehicle 102. The probability may be a numerical probability, e.g., between 0 and 1.0, which may be the highest probability from among multiple probabilities that the object will impact the planned path. For instance, each object or object may take any number of actions. However, only a subset of all those actions will actually impact travel of the vehicle 102. Techniques described herein may identify the action from within that subset of actions having the highest probability of impacting travel, and use that probability at 308. In some examples, the probability may be determined based at least in part on information about each of the objects, which information may include physical features associated with the objects, including but not limited to an extent of an object (e.g., height, weight, length, etc.), a pose of the object (e.g., x-coordinate, y-coordinate, z-coordinate, pitch, roll, yaw), a velocity of the object, an acceleration of the object, a direction of travel of the object (e.g., heading), a semantic classification, etc., as described herein. Additionally or alternatively, such features can include an orientation relative to a sensor (e.g., which direction is a pedestrian facing), distance to a map feature (e.g., a start of a crosswalk, an end of a crosswalk, a side of a crosswalk, a start of a junction, an end of a junction, a side of a junction, etc.), semantic features (e.g., crosswalk sign, traffic lights, etc.), feasibility of performing an intent (e.g., cross-ability of a crosswalk, etc.), etc. In some examples, data from one or more of the localization system, the planner system, the prediction system, and/or the perception system may be used at block 306 to determine the features. The features may also include a predicted trajectory of the object(s) and/or course of action. In at least one example, the vehicle may analyze the sensor data and/or the map data to determine an event associated with an object (e.g., a cut-in event, a crosswalk event, etc.). The prediction system 224 may then determine a probability of the event happening. In the context of FIG. 1, 308 may include determining a probability that the first additional vehicle 104a will change lanes and determining a probability that the pedestrian will enter the road 122.

At 310, the method 300 can include determining, for each object, whether the probability is equal to or above a threshold probability. In some implementations, the vehicle computing device(s) 204 may determine that certain identified objects should be considered when determining an acceleration for the vehicle 202 and/or potential actions taken by the objects, whereas other objects should be ignored. For example, some objects may be of such a low likelihood of impacting travel that they may not be considered by the acceleration determination system 228 to determine the control acceleration. Using the example of FIG. 1, if the second additional vehicle 104b was positioned substantially next to the vehicle 102, instead of ahead of the vehicle 102, the vehicle computing device(s) 112, 204 may determine that there is a relatively low (i.e., below a threshold) probability that the second additional vehicle 104b will change lanes. In this instance, the vehicle computing device(s) 112, 204 may not consider the second additional vehicle 104b when determining an acceleration, despite identifying the second additional vehicle 104b. Similarly, other objects that are far away from the vehicle 102, are behind the vehicle 102, that are not expected to move, e.g., parked cars, buildings, or the like, may have a sufficiently low probability of moving that they may not be considered when determining the acceleration. In some examples, such objects may be included. As a non-limiting example, the system may account for associated probabilities of parked cars moving into a drive lane. In examples, the threshold probability at which objects are considered may be any threshold, e.g., a non-zero threshold. In some examples, the threshold may be between about 0.1 and about 0.5 when probabilities range from 0 to 1.0.

If it is determined at 310 that the probability that the object will enter the planned path is below the threshold, at 312 the method 300 can include disregarding the object in determining control acceleration. For example, because the object (and/or a predicted action of the object) is below the threshold probability, the object is effectively ignored for purposes of determining an acceleration at which to proceed. In this manner, although an object is identified as being in the environment 100, it may not be necessary to control the vehicle 102, e.g. accelerate or decelerate, in response to that object. As noted above, the sensor system(s) 206 may sense information about a large number of objects in the environment, but only certain of those objects may be considered likely to impact acceleration of the vehicle 202 as it traverses the environment. For example, objects may have a relatively low probability of impacting travel of the vehicle 102, and thus may be may be excluded, based on their position relative to the vehicle 202, based on their velocity relative to that of the vehicle 202, or the like. As will be appreciated, each object.

Alternatively, if it is determined at block 310 that the probability that the object will impact travel along the planned path meets or exceeds the threshold, the method 300 may proceed to block 314. At 314, the method 300 may include determining a second acceleration for reacting to the object. In some examples, the second acceleration may be an acceleration at which the vehicle 102 would be controlled in the event that there is an extreme likelihood, e.g., a virtual certainty, that an object will enter the travel path 118 of the vehicle 102. Thus, and again referencing the example of FIG. 1, the second acceleration may be an acceleration (which may be a deceleration or a zero-acceleration) at which the vehicle 102 would be controlled if the second additional vehicle 104b changes lanes from the second lane 126 to the first lane and/or the pedestrian 106 walks into the road 122. As described above, in some conventional systems, the vehicle may be controlled in accordance with the second acceleration upon a determination that the probability that the object, e.g., the second additional vehicle 104b and/or the pedestrian 106, is going to enter the path of travel 118 is above a threshold.

At 316, the method 300 can include determining a first weighting factor for the first acceleration and a second weighting factor for the second acceleration. For example, the vehicle computing device(s) 204, e.g., executing the acceleration determination system 228, may determine the first weighting factor as a predetermined, static weighting factor, and the second weighting factor as a function of the probability determined at 308. By way of non-limiting example, the first weighting factor may be a weighting factor of 10, whereas the second weighting factor may vary from 1 to 10, depending upon the probability of the object impacting travel, e.g., entering the drive path 118. For instance, the weighting factor may be linearly proportional to the probability. As described herein, other relationships between the probability and the weighting factor, and other values and scales for the weighting factors may also be used, and are contemplated by this disclosure. The weighting factors may vary based on the application, and based on a desired relation of the objects and accelerations. Moreover, the weighting factors may vary based on the type of the object. For instance, a pedestrian may be weighted differently than a vehicle, which may be weighted differently than other objects and/or events.

At 318, the method 300 can include determining a third acceleration based on the first weighting factor, the first acceleration, the second weighting factor, and the second acceleration. For instance, as described herein, the acceleration determination system 228 may perform an optimization using the first weighting factor, the first acceleration, the second weighting factor, and the second acceleration. The optimization may determine the third acceleration as a minimum deviation from each of the candidate accelerations, e.g., the first acceleration and the second acceleration, while accounting for the weighting factors. The Equation (1) described above uses L2 norms and, accordingly, the third acceleration may be a weighted average of the first and second accelerations. While only a single second acceleration is used in the example of the method 300, it will be appreciated that additional objects may also be considered in determining the control acceleration.

At 320, the method 300 can include controlling the vehicle according to the third acceleration. As described above, the vehicle computing device(s) 204 can include one or more system controllers 230, which can be configured to control steering, propulsion, braking, safety, emitters, communication, and other systems of the vehicle 202. These system controller(s) 230 can communicate with and/or control corresponding systems of the drive module(s) 214 and/or other components of the vehicle 202. In at least one example, the system controller(s) 228 can receive the acceleration as a component of a trajectory and can communicate with and/or control corresponding systems of the drive module(s) 214 and/or other components of the vehicle 202 such to cause the vehicle 202 to navigate along the trajectory.

An example of the method 300 now will be described with reference to FIG. 1. Specifically, at 302, vehicle computing device(s) 112, e.g., using a planning system, may determine the vehicle path 118 through the environment 100. At 304, the vehicle computing device(s) 112, e.g., using the planning system and/or the acceleration determination system 114, may determine a first acceleration, which may be an acceleration for maintaining a predetermined distance from the first additional vehicle 104a in the first lane 124. In this example, the acceleration may be 0.5 m/s$^2$. At 306, the vehicle computing device(s) may receive the sensor data 110, which indicates the presence of at least the second additional vehicle 104b and the pedestrian 106. The sensor data 110 may also include information about the vehicle 104b and/or the pedestrian, including, velocity, acceleration, pose, an object type, an object classification, and/or other information. At 308, the vehicle computing device(s) 112, e.g., using a prediction system, may also determine a first probability that the second additional vehicle 104b will enter the vehicle path 118 and a second probability that the pedestrian will enter the vehicle path 118. For example, the first probability may be 0.6 and the second probability may be 0.15.

At 310, the vehicle computing device(s) 112 may determine that the second probability is below a threshold, e.g., 0.4, and thus, at 312, may disregard the pedestrian in determining the acceleration. Also at 310, the vehicle computing device(s) 112 may determine that the first probability (associated with the second additional vehicle 104b) exceeds the 0.4 threshold. Thus, at 314, the vehicle computing device(s) 112 may determine a second acceleration for reacting to the second additional vehicle 104b. The second acceleration may be an acceleration at which the vehicle 102 would proceed if the second additional vehicle 104b is, in fact, executing a lane change into the first lane 124. In this example, the second acceleration may be 0.0 m/s². Then, at 316, the vehicle computing device(s) 112 may determine a first weighting factor for the first acceleration and a second weighting factor for the second acceleration. The first weighting factor may be fixed, e.g., the integer 10 in this example, and the second weighting factor may be based on the first probability calculated at 308. In this example, the second weighting factor may be 5. At 318, the vehicle computing device(s) 112, e.g., using the acceleration determination system 114, may determine an acceleration for controlling the vehicle 102 based on the first acceleration, the first weighting factor, the second acceleration, and the second weighting factor. For example, the acceleration may be determined as an optimization, such as an optimization of the equation (1), discussed above. In some examples, and because the optimization may use an L2 loss function, the control acceleration may be 0.33 m/s², which is the weighted average of the two accelerations (e.g., (0.5 m/s²*10+0.0 m/s²*5)/15=0.33 m/s²). At 320, the vehicle 102 is controlled to accelerate at 0.33 m/s².

In a conventional system, the 0.6 probability associated with the second additional vehicle 104b changing lanes may have resulted in the vehicle 102 being controlled to immediately proceed at the second acceleration (0.0 m/s²), instead of accelerating behind the accelerating first additional vehicle 104a. However, if at a next time interval, the second probability has decreased below some threshold, e.g., 0.5, the vehicle 102 may accelerate quickly (even more quickly than the 0.5 m/s² first acceleration) to return to a predetermined distance behind the first additional vehicle 104a. In contrast, according to techniques described herein, a similar change in probability associated with the second additional vehicle 104b would not result in the drastic changes in acceleration plaguing conventional systems.

As will be appreciated, as the vehicle moves through the environment, objects in the environment are ever-changing. Accordingly, the method 300 may be carried out iteratively. For example, status of objects in the environment, including probabilities that those objects will enter the path of travel of the vehicle 102, may be determined in near real-time, e.g., at intervals of from about 0.5 seconds to about 3 seconds. Moreover, as objects change positions, velocities, attitudes, and the like, relative to the vehicle, objects previously excluded from the acceleration determination may be included and objects previously included may be excluded, e.g., as probabilities associated with those objects change.

Although not illustrated in FIG. 3, in some implementations techniques described herein may determine that an event is so likely to occur that the vehicle will react to that event. For example, at 310 in FIG. 3 it is determined whether a probability that an object will impact a planned path meets or exceeds a threshold. In some implementations, that threshold may be a first threshold and another block may include determining whether the probability meets or exceeds a second, higher probability. In such an example, if the probability meets or exceeds the second probability, techniques described herein may determine that it is very likely that the object will impact the planned path, and thus determine to control the vehicle according to the second acceleration for reacting to the object. Accordingly, when an object is very likely to impact travel along the planned path, the vehicle may react only to that object, e.g., without an optimization step. In some examples, the second threshold may be 0.8, 0.9 or some other probability value.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: one or more sensors disposed on the vehicle; one or more processors; and memory storing processor-executable instructions that, when executed by the one or more processors, configure the vehicle to: determine a planned path of the vehicle through an environment; determine a first acceleration of the vehicle along the planned path; receive sensor data from the one or more sensors, the sensor data comprising information about an object in the environment; determine, based at least in part on the sensor data, that a probability that the object will impact travel of the vehicle along the planned path meets or exceeds a threshold probability; determine a second acceleration of the vehicle along the planned path, the second acceleration being an acceleration of the vehicle responsive to the object impacting travel of the vehicle along the planned path; determine a first weighting factor associated with the first acceleration; determine a second weighting factor associated with the second acceleration; determine, based at least on the first acceleration, the second acceleration, the first weighting factor, and the second weighting factor, a third acceleration of the vehicle along the planned path, the third acceleration being different from the first acceleration and the second acceleration; and control the vehicle to accelerate along the planned path in accordance with the third acceleration.

B: The vehicle of example A, wherein the instructions, when executed by the one or more processors, further configure the vehicle to: wherein the second weighting factor is based at least in part on the probability or a classification of the object.

C: The vehicle of example A or example B, wherein the first weighting factor is a fixed weighting factor and the second weighting factor is a function of the probability.

D: The vehicle of any one of example A through example C, wherein the threshold probability is a first threshold and the instructions, when executed by the one or more processors, further configure the vehicle to: determine that the probability meets or exceeds the first threshold; and determine that the probability is equal to or below a second threshold higher than the first threshold.

E: The vehicle of any one of example A through example D, wherein the instructions, when executed by the one or more processors, further configure the vehicle to at least one of: control the vehicle to accelerate along the planned path at the first acceleration in response to determining that the probability is below the first threshold; or control the vehicle to accelerate along the planned path at the second acceleration in response to determining that the probability is above the second threshold.

F: The vehicle of any one of example A through example E, wherein the first weight is based at least in part on at least one of a speed limit associated with a road on which the planned path is disposed, a velocity of a second object in the planned path, an acceleration of the second object, or a distance between the second object and the vehicle.

G: The vehicle of any one of example A through example F, wherein the object is a first object, the probability is a first probability, and the instructions, when executed by the one or more processors, further configure the vehicle to: identify a second object in the environment; determine a second probability that the second object will enter the planned path of the vehicle; determine a fourth acceleration of the vehicle along the planned path, the fourth acceleration being an acceleration of the vehicle responsive to the second object entering the planned path of the vehicle; and determine, based at least in part on the second probability, a third weighting factor associated with the fourth acceleration, wherein the third acceleration is further determined based at least in part on the fourth acceleration and the third weighting factor.

H: An example method includes: determining a planned path of a vehicle through an environment; determining a first acceleration of the vehicle along the planned path; identifying, based at least in part on sensor data acquired from a sensor on the vehicle, an object in the environment; determining a second acceleration of the vehicle along the planned path based at least in part on the object; determining a probability that the object will impact the planned path of the vehicle; determining, based at least on the first acceleration, the second acceleration, and the probability, a third acceleration of the vehicle along the planned path, the third acceleration being different from the first acceleration and the second acceleration; and controlling the vehicle to accelerate along the planned path at the third acceleration.

I: The method of example H, further comprising: determining a first weighting factor associated with the first acceleration; and determining a second weighting factor associated with the second acceleration, wherein the third acceleration is based at least in part on an optimization performed using the first acceleration, the second acceleration, the first weighting factor, and the second weighting factor.

J: The method of example H or example I, wherein the second weighting factor is at least one of a linear function or a higher-order function of the probability.

K: The method of any one of example H through example J, further comprising: determining that the probability is equal to or above a first threshold; and determining that the probability is equal to or below a second threshold higher than the first threshold.

L: The method of any one of example H through example K, wherein the object is a first object and the probability is a first probability, the method further comprising: identifying a second object in the environment; determining a second probability that the second object will impact the planned path of the vehicle; determining a fourth acceleration of the vehicle along the planned path, the fourth acceleration being an acceleration of the vehicle responsive to the second object impacting the planned path of the vehicle; and determining, based at least in part on the second probability, a third weighting factor associated with the fourth acceleration, wherein the optimization is further performed using the fourth acceleration and the third weighting factor.

M: The method of any one of example H through example L, further comprising: determining a first classification of the first object, wherein the second weighting factor is based at least in part on the first classification; and determining a second classification of the second object, wherein the third weighting factor is based at least in part on the second classification.

N: Example non-transitory computer-readable medium having a set of instructions that, when executed, cause one or more processors to perform operations comprising: determining a planned path of a vehicle through an environment; determining a first acceleration of the vehicle along the planned path; identifying, based at least in part on sensor data acquired from a sensor on the vehicle, an object in the environment; determining a second acceleration of the vehicle along the planned path based at least in part on the object; determining a probability that the object will impact the planned path of the vehicle; determining, based at least on the first acceleration, the second acceleration, and the probability, a third acceleration of the vehicle along the planned path, the third acceleration being different from the first acceleration and the second acceleration; and controlling the vehicle to accelerate along the planned path at the third acceleration.

O: The non-transitory computer-readable medium of example N, the operations further comprising: determining a first weighting factor associated with the first acceleration; and determining a second weighting factor associated with the second acceleration, wherein the third acceleration is based at least in part on an optimization performed using the first acceleration weighted by the first weighting factor and the second acceleration weighted by the second weighting factor.

P: The non-transitory computer-readable medium of example N or example O, wherein the second weighting factor is based at least in part on a value of the probability, a classification of the object, or a speed of the vehicle.

Q: The non-transitory computer-readable medium of any one of example N through example P, the operations further comprising: determining that the probability is equal to or above a first threshold; and determining that the probability is equal to or below a second threshold higher than the first threshold.

R: The non-transitory computer-readable medium of any one of example N through example Q, wherein the object is a first object and the probability is a first probability, the operations further comprising: identifying a second object in the environment; determining a second probability that the second object will impact the planned path of the vehicle; based at least in part on the second probability being below the first threshold, excluding the second object from the determining the third acceleration; and based at least in part on the second probability being equal to or above the first threshold: determining a fourth acceleration of the vehicle based at least in part on the second object; and determining third weighting factor based on the second probability, wherein the determining the third acceleration is further based at least in part on the fourth acceleration and the third weighting factor.

S: The non-transitory computer-readable medium of any one of example N through example R, wherein the first weight is based at least in part on at least one of a speed limit associated with a road on which the planned path is disposed, a velocity of a second object in the planned path, an acceleration of the second object, or a distance of the second object from the vehicle.

T: The non-transitory computer-readable medium of any one of example N through example S, wherein the determining the third acceleration further includes predicting one or more positions of the vehicle and the object over a future time period, determining accelerations at a plurality of time steps in the future time period, and determining the third acceleration based on the accelerations.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
one or more sensors disposed on the vehicle;
one or more processors; and
memory storing processor-executable instructions that, when executed by the one or more processors, configure the vehicle to:
determine a planned path of the vehicle through an environment;
determine a first acceleration of the vehicle to execute the planned path;
receive sensor data from the one or more sensors, the sensor data comprising information about an object in the environment;
determine, based at least in part on the sensor data, that a probability that the object will impact travel of the vehicle along the planned path meets or exceeds a threshold probability;
determine a second acceleration of the vehicle along the planned path, the second acceleration being an acceleration of the vehicle responsive to the object impacting travel of the vehicle along the planned path;
determine a first weighting factor associated with the first acceleration;
determine a second weighting factor associated with the second acceleration;
determine, as a function of at least the first acceleration, the second acceleration, the first weighting factor, and the second weighting factor, a third acceleration of the vehicle to execute planned path, the third acceleration being different from the first acceleration and the second acceleration; and
control the vehicle to execute the planned path in accordance with the third acceleration.

2. The vehicle of claim 1, wherein the instructions, when executed by the one or more processors, further configure the vehicle to:
wherein the second weighting factor is based at least in part on the probability or a classification of the object.

3. The vehicle of claim 2, wherein the first weighting factor is a fixed weighting factor and the second weighting factor is a function of the probability.

4. The vehicle of claim 2, wherein the threshold probability is a first threshold and the instructions, when executed by the one or more processors, further configure the vehicle to:
determine that the probability meets or exceeds the first threshold; and
determine that the probability is equal to or below a second threshold higher than the first threshold.

5. The vehicle of claim 4, wherein the instructions, when executed by the one or more processors, further configure the vehicle to at least one of:
control the vehicle to accelerate along the planned path at the first acceleration in response to determining that the probability is below the first threshold; or
control the vehicle to accelerate along the planned path at the second acceleration in response to determining that the probability is above the second threshold.

6. The vehicle of claim 1, wherein the first weight is based at least in part on at least one of a speed limit associated with a road on which the planned path is disposed, a velocity of a second object in the planned path, an acceleration of the second object, or a distance between the second object and the vehicle.

7. The vehicle of claim 2, wherein the object is a first object, the probability is a first probability, and the instructions, when executed by the one or more processors, further configure the vehicle to:
identify a second object in the environment;
determine a second probability that the second object will enter the planned path of the vehicle;
determine a fourth acceleration of the vehicle along the planned path, the fourth acceleration being an acceleration of the vehicle responsive to the second object entering the planned path of the vehicle; and determine, based at least in part on the second probability, a third weighting factor associated with the fourth acceleration, wherein the third acceleration is further determined based at least in part on the fourth acceleration and the third weighting factor.

8. A method comprising:

determining a planned path of a vehicle through an environment;

determining a first acceleration of the vehicle to execute the planned path;

identifying, based at least in part on sensor data acquired from a sensor on the vehicle, an object in the environment;

determining a second acceleration of the vehicle, different from the first acceleration, to execute the planned path based at least in part on the object;

determining a probability that the object will impact the planned path of the vehicle;

determining, based at least on the first acceleration, the second acceleration, and the probability, a third acceleration of the vehicle to execute the planned path, the third acceleration being different from the first acceleration and from the second acceleration; and controlling the vehicle to execute the planned path at the third acceleration.

9. The method of claim 8, further comprising:

determining a first weighting factor associated with the first acceleration; and determining a second weighting factor associated with the second acceleration;

wherein the third acceleration is based at least in part on an optimization performed using the first acceleration, the second acceleration, the first weighting factor, and the second weighting factor.

10. The method of claim 9, wherein the second weighting factor is at least one of a linear function or a higher-order function of the probability.

11. The method of claim 8, further comprising:

determining that the probability is equal to or above a first threshold; and determining that the probability is equal to or below a second threshold higher than the first threshold.

12. The method of claim 9, wherein the object is a first object and the probability is a first probability, the method further comprising:

identifying a second object in the environment;

determining a second probability that the second object will impact the planned path of the vehicle;

determining a fourth acceleration of the vehicle along the planned path, the fourth acceleration being an acceleration of the vehicle responsive to the second object impacting the planned path of the vehicle; and determining, based at least in part on the second probability, a third weighting factor associated with the fourth acceleration, wherein the optimization is further performed using the fourth acceleration and the third weighting factor.

13. The method of claim 12, further comprising:

determining a first classification of the first object, wherein the second weighting factor is based at least in part on the first classification; and determining a second classification of the second object, wherein the third weighting factor is based at least in part on the second classification.

14. Non-transitory computer-readable medium having a set of instructions that, when executed, cause one or more processors to perform operations comprising:

determining a planned path of a vehicle through an environment;

determining a first acceleration of the vehicle to execute the planned path;

identifying, based at least in part on sensor data acquired from a sensor on the vehicle, an object in the environment;

determining a second acceleration of the vehicle, different from the first acceleration, to execute the planned path based at least in part on the object;

determining a probability that the object will impact the planned path of the vehicle;

determining, based at least on the first acceleration, the second acceleration, and the probability, a third acceleration of the vehicle to execute the planned path, the third acceleration being different from the first acceleration and the second acceleration; and controlling the vehicle to execute the planned path at the third acceleration.

15. The non-transitory computer-readable medium of claim 14, the operations further comprising:

determining a first weighting factor associated with the first acceleration; and determining a second weighting factor associated with the second acceleration, wherein the third acceleration is based at least in part on an optimization performed using the first acceleration weighted by the first weighting factor and the second acceleration weighted by the second weighting factor.

16. The non-transitory computer-readable medium of claim 15, wherein the second weighting factor is based at least in part on a value of the probability, a classification of the object, or a speed of the vehicle.

17. The non-transitory computer-readable medium of claim 14, the operations further comprising:

determining that the probability is equal to or above a first threshold; and determining that the probability is equal to or below a second threshold higher than the first threshold.

18. The non-transitory computer-readable medium of claim 14, wherein the object is a first object and the probability is a first probability, the operations further comprising:

identifying a second object in the environment;

determining a second probability that the second object will impact the planned path of the vehicle;

based at least in part on the second probability being below the first threshold, excluding the second object from the determining the third acceleration; and based at least in part on the second probability being equal to or above the first threshold:

determining a fourth acceleration of the vehicle based at least in part on the second object; and determining third weighting factor based on the second probability, wherein the determining the third acceleration is further based at least in part on the fourth acceleration and the third weighting factor.

19. The non-transitory computer-readable medium of claim 14, wherein the first weight is based at least in part on at least one of a speed limit associated with a road on which the planned path is disposed, a velocity of a second object in the planned path, an acceleration of the second object, or a distance of the second object from the vehicle.

20. The non-transitory computer-readable medium of claim 14, wherein the determining the third acceleration further includes predicting one or more positions of the vehicle and the object over a future time period, determining accelerations at a plurality of time steps in the future time period, and determining the third acceleration based on the accelerations.

* * * * *